US 8,363,051 B2

(12) United States Patent
Deffeyes

(10) Patent No.: US 8,363,051 B2
(45) Date of Patent: Jan. 29, 2013

(54) NON-REAL-TIME ENHANCED IMAGE SNAPSHOT IN A VIRTUAL WORLD SYSTEM

(75) Inventor: Suzanne Carol Deffeyes, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 12/436,944

(22) Filed: May 7, 2009

(65) Prior Publication Data

US 2010/0283795 A1 Nov. 11, 2010

(51) Int. Cl.
*G06T 15/00* (2011.01)
(52) U.S. Cl. .................................................. 345/419
(58) Field of Classification Search .................. None
See application file for complete search history.

(56) References Cited

U.S. PATENT DOCUMENTS

| | | | |
|---|---|---|---|
| 6,151,033 A * | 11/2000 | Mihara et al. | 345/475 |
| 6,366,285 B1 * | 4/2002 | Brush et al. | 345/473 |
| 6,377,257 B1 * | 4/2002 | Borrel et al. | 345/419 |
| 6,961,060 B1 | 11/2005 | Mochizuki et al. | |
| 7,053,916 B2 | 5/2006 | Kobayashi et al. | |
| 7,289,118 B2 | 10/2007 | Schmittler et al. | |
| 2002/0054129 A1 | 5/2002 | Heron et al. | |
| 2010/0214214 A1 * | 8/2010 | Corson et al. | 345/158 |

\* cited by examiner

*Primary Examiner* — Ryan R Yang
(74) *Attorney, Agent, or Firm* — Yee & Associates, P.C.; David A. Mims, Jr.

(57) ABSTRACT

A computer implemented method, a tangible computer storage medium, and a data processing system generate a non-real-time image snapshot in a virtual world. A backend rendering system receives a scene description from a virtual world server. The backend rendering system then retrieves a high fidelity graphics from a visual database. The visual database contains both the high fidelity graphics and a lightweight graphics. The lightweight graphics are utilized to render the virtual world at a virtual world client application. The backend rendering system then renders the non-real-time image snapshot, and processes the non-real-time image snapshot into the desired format. The non-real-time image snapshot can then be delivered to a client.

20 Claims, 5 Drawing Sheets

VISUAL DATABASE 500

| OBJECT IDENTIFIERS 510 | LIGHTWEIGHT GRAPHICS 512 | HIGH FIDELITY GRAPHICS 514 |
|---|---|---|
| 1 | lwg 1 | hfg 1 |
| 2 | lwg 2 | hfg 2 |
| 3 | lwg 3 | hfg 3 |
| 4 | lwg 4 | hfg 4 |

NON-REAL-TIME ENHANCED IMAGE SNAPSHOT IN A VIRTUAL WORLD SYSTEM

BACKGROUND OF THE INVENTION

1. Field of the Invention

The present invention is related generally to a computer implemented method, a tangible computer storage medium and a data processing system. More particularly, the present invention is related generally to a computer implemented method, a tangible computer storage medium and a data processing system for providing non-real-time enhanced image snapshots in a virtual world system.

2. Description of the Related Art

A virtual world (VW), also referred to as a metaverse, is a computer-based simulated environment. Examples of virtual worlds include Second Life®, Entropia Universe, The Sims Online®, There, and Red Light Center. Other examples of virtual worlds include multiplayer online games, such as EverQuest®, Ultima Online®, Lineage®, and World of Warcraft® (WoW).

Many virtual worlds are represented using three dimensional (3-D) graphics and landscapes. The properties and elements of the virtual world often resemble the properties of the real world, such as in terms of physics, and 3D content such as houses, and landscapes. Virtual worlds may be populated by thousands of users simultaneously. In a virtual world, users are sometimes referred to as "residents" or "agents"

The users in a virtual world can interact, inhabit, and traverse the virtual world through the use of avatars. An avatar is a graphical representation of a user that other users in the virtual world can see and interact with. The avatar's appearance is typically selected by the user and often takes the form of a cartoon-like representation of a human. However, avatars may also have non-human appearances, such as animals, elves, trolls, orcs, fairies, and other fantasy creatures.

A viewable field is the field of view for a particular user. The viewable field for a particular user may include objects, as well as avatars belonging to other users. An object is an element in a virtual world that does not represent a user. An object may be, for example, buildings, statues, billboards, signs, and advertisements in the virtual world. The viewable field of a particular user is determined by the virtual world software according to the geometries and textures that are currently loaded in a user's virtual world client. The virtual world software determines the length of time that a user views an object based on processing the data sent to each virtual world client.

Some virtual worlds allow each virtual world client to record images of the virtual world by taking a snapshot, or screenshot, of the particular user's viewable field. The snapshot is typically performed locally on the virtual world client's machine, using local 3-D rendering hardware and software. The level of detail and realism of the rendered 3-D image therefore matches the level of detail and realism rendered by the virtual world.

However, due to the interactive nature and requirements of the virtual world, the level of detail and realism rendered by the virtual world is significantly less than the level of detail and realism that is achievable with current 3-D hardware and 3-D software rendering applications. Images within the virtual world must be rendered quickly to provide the virtual world client with a smooth navigational and visual experience. The level of detail and realism rendered by the virtual world client is often compromised in order to render quickly the changing environment of the virtual world. The CPU/GPU processing requirements are simply too high to create a high quality video stream of a running virtual world on a client machine.

BRIEF SUMMARY OF THE INVENTION

According to one embodiment of the present invention, a computer implemented method, apparatus, and computer usable program product is provided for generating a non-real-time image snapshot in a virtual world. A graphics-processing unit receives a scene description from a virtual world server. The graphics-processing unit then retrieves a first set of graphics from a visual database. The visual database contains both the first set of graphics and a second set of graphics. The second set of graphics are utilized to render the virtual world at a virtual world client application. The first set of graphics are not utilized by the virtual world client application in rendering the virtual world in real time. The graphics-processing unit then renders the non-real-time image snapshot from the first set of graphics and the scene description, and processes the non-real-time image snapshot into the desired format. The non-real-time image snapshot can then be delivered to a client application.

DETAILED DESCRIPTION OF THE INVENTION

Figure 1:
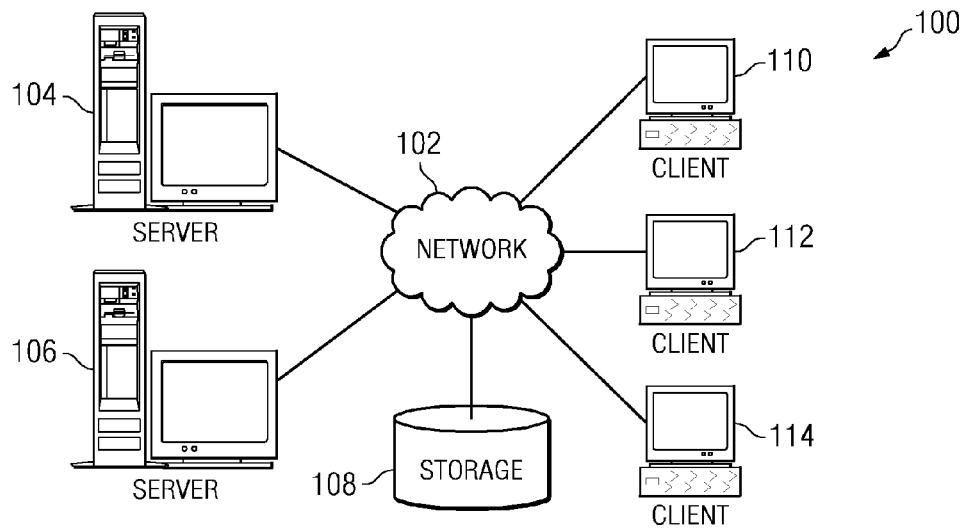
FIG. 1 depicts a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
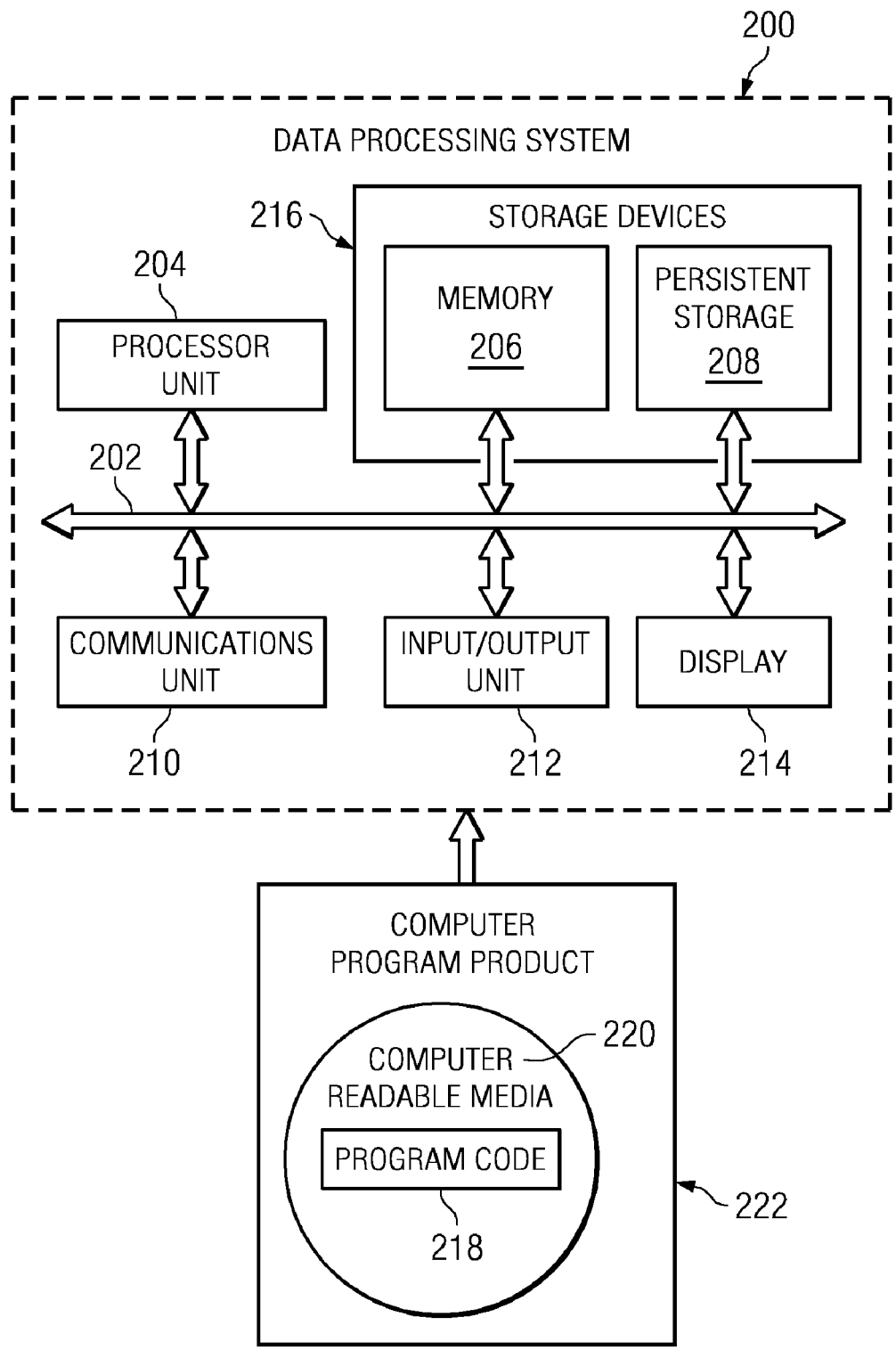
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code. As one example, the data processing system may include organic components integrated with organic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments described herein provide a computer implemented method, a tangible computer storage medium, and a data processing system for generating a non-real-time image snapshot in a virtual world. A backend rendering system receives a scene description from a virtual world server. The backend rendering system then retrieves a high fidelity graphics from a visual database. High fidelity graphics are a high fidelity version of geometry, textures, shaders that are utilized by a backend rendering system to create high fidelity snapshots and videos. Due to the bandwidth and processing requirements, high fidelity graphics are not utilized by the virtual world client application in rendering the virtual world in real time.

The visual database contains both the high fidelity graphics and a lightweight graphics. The lightweight graphics are utilized to render the virtual world at a virtual world client application. The backend rendering system then renders the non-real-time image snapshot, and processes the non-real-time image snapshot into the desired format. The non-real-time image snapshot can then be delivered to a client. A snapshot is a graphical rendering of the viewable field of a particular user's avatar, as displayed by the virtual world client application. The snapshot can be a static image, or a video of the rendering of the viewable field.

Figure 3:
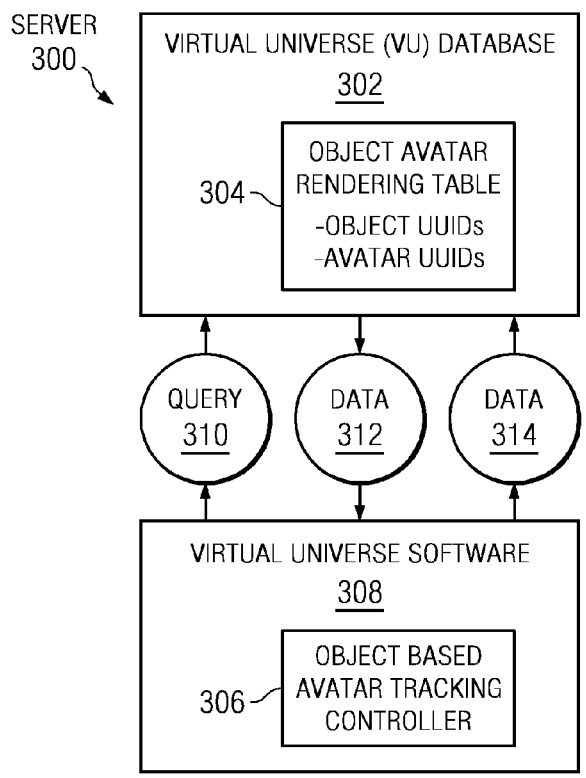
FIG. 3 is a block diagram illustrating a virtual world server in accordance with an illustrative embodiment.

FIG. 3 is a block diagram illustrating a virtual world server in accordance with an illustrative embodiment. Server 300 is a server associated with a virtual world. Server 300 may be a single, stand-alone server, or server 300 may be a server in a virtual world computing system or in a cluster of two or more servers. In this example, server 300 is a server in a computing system for rendering and managing a virtual world.

Virtual world database 302 is a database on the computing system for storing data used by virtual world software 308 to render and manage the virtual world. Virtual world database 302 includes object avatar rendering (OAR) table 304. Object avatar rendering table 304 stores object universally unique identifiers and avatar universally unique identifiers.

In a virtual world, assets, avatars, the environment, and anything visual consists of universally unique identifiers (UUIDs) tied to geometric data, textures, and effects data. Geometric data is data associated with the form or shape of avatars and objects in the virtual world. Geometric data may be used to construct a rendered mesh of an avatar or object. Geometric data is distributed to a user's client computer as binary coordinates. Textures are distributed to a user's client computer as graphics files, such as JPEG files. Texture data refers to the surface detail and surface textures or color that is applied to mesh geometric data to render the object or avatar. Effects data is typically rendered by the user's client according to the user's preferences and the user's client device capabilities.

Object avatar rendering table 304 stores a universally unique identifier (UUID) for each selected object in the virtual world. A selected object is an object in a plurality of objects in the virtual world that is tracked, monitored, managed, or associated with object avatar rendering table 304. Object avatar rendering table 304 also stores universally unique identifiers and other data describing avatars within a viewable field of a selected object or within a selected zone or range associated with the selected object. For example, if the selected objects include object A and object B, then object avatar rendering table 304 stores object A universally unique identifier, universally unique identifiers and other data for all avatars and objects within selected range of object A, object B universally unique identifier, and universally unique identifiers and other data describing all avatars and objects within selected range of object B.

Object based avatar tracking controller 306 stores data 314 in object avatar rendering table 304. Data 314 includes the universally unique identifiers and other data describing avatars within the viewable field of one or more selected objects. When object based avatar tracking controller 306 needs data from object avatar rendering table 304 for implementing geometric and texture modifications in the virtual world, object based avatar tracking controller 306 sends query 310 to object avatar-rendering table 304. In response to query 310, virtual world database 302 sends data 312 to virtual world software 308 for utilization by object based avatar tracking controller 306 to track avatars and implement modifications of the selected objects to improve the location and appearance of the selected objects within the virtual world and enable improved visibility of the selected objects.

Virtual world software 308 is software for rendering the virtual world. Virtual world software 308 includes object-based avatar tracking controller 306. Object based avatar tracking controller 306 is software for tracking avatars within the viewable field of each selected object.

Object avatar rendering table 304 stores a universally unique identifier (UUID) for each selected object in the virtual world. A selected object is an object in a plurality of objects in the virtual world that is tracked, monitored, managed, or associated with object avatar rendering table 304. Object avatar rendering table 304 also stores universally unique identifiers and other data describing avatars within a viewable field of a selected object or within a selected zone or range associated with the selected object. For example, if the selected objects include object A and object B, then object avatar rendering table 304 stores object A universally unique identifier, universally unique identifiers and other data for all avatars within the viewable field of object A, object B universally unique identifier, and universally unique identifiers and other data describing all avatars within the viewable field of object B.

Object avatar rendering table 304 stores a universally unique identifier (UUID) for each selected object in the virtual world. A selected object is an object in a plurality of objects in the virtual world that is tracked, monitored, managed, or associated with object avatar rendering table 304. Object avatar rendering table 304 also stores universally unique identifiers and other data describing avatars within a viewable field of a selected object or within a selected zone or range associated with the selected object. For example, if the selected objects include object A and object B, then object avatar rendering table 304 stores object A universally unique identifier, universally unique identifiers and other data for all avatars within the viewable field of object A, object B universally unique identifier, and universally unique identifiers and other data describing all avatars within the viewable field of object B.

Figure 4:
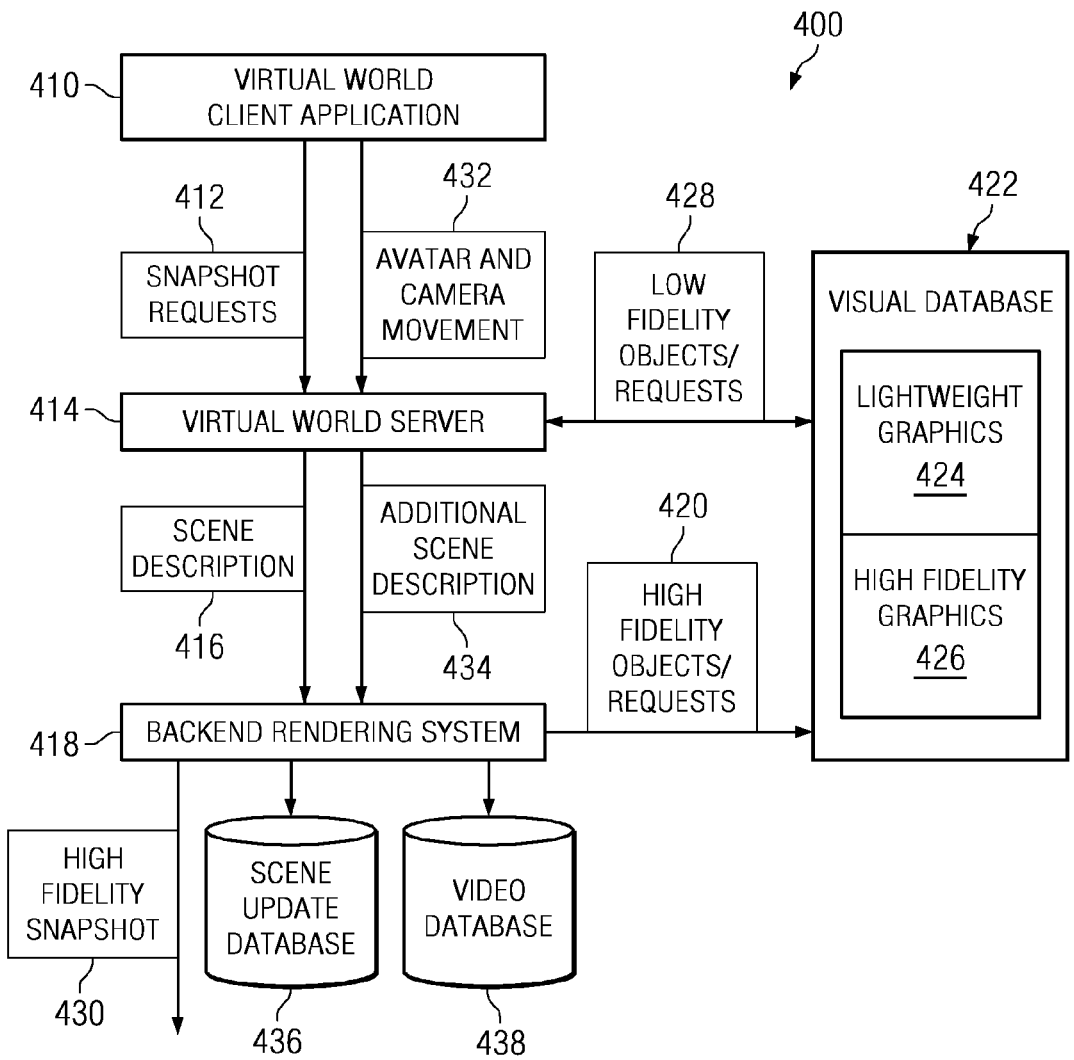
FIG. 4 is a block diagram of the data flow between various hardware and software components of a client/server environment implementing a virtual world according to an illustrative embodiment.

Referring now to FIG. 4, a block diagram of the data flow between various hardware and software components of a client/server environment implementing a virtual world is shown according to an illustrative embodiment.

Virtual World client application 410 is a software application, executing on a client data processing system, such as one of clients 110, 112, and 114 of FIG. 1. Virtual World client application 410 allows for connection to, and interaction within a virtual world. In response to an indication from a user, virtual world client application 410 sends snapshot request 412 to virtual world server 414. Snapshot request 412 is a request for a graphical rendering of the viewable field of a particular user's avatar, as displayed by virtual world client application 410. The snapshot request can be a request for a static image, or a video of the rendering of the viewable field.

Virtual world server 414 is a data processing system that executes software to enable a virtual world, such as virtual world server 300. Responsive to receiving snapshot request 412, virtual world server 414 forwards scene descriptions 416 to backend rendering system 418. Scene description 416 is a non-graphical representation of the viewable field of a particular user's avatar. Scene description 416 includes virtual world location information such as an exact camera location within the virtual world, and a camera angle vector. The exact camera location within the virtual world and the camera angle vector can be expressed as coordinates in a 3-D coordinate system, such as for example in an <X, Y, Z> format. Scene description 416 can also include information regarding the format and delivery of the rendered snapshot, such as for example but not limited to, an image size, a file type format, delivery options, whether to include avatars within the snapshot, and desired fidelity/resolution of the snapshot. Scene description 416 going to backend rendering system 418 are a subset of the updates going to the client.

Backend rendering system 418 is a graphics-processing unit capable of generating images and video of activity within a virtual world. Backend rendering system 418 is capable of rendering images and video of higher quality than local 3-D rendering hardware and software running virtual world client application 410 because backend rendering system 418 utilizes images and textures that are themselves not used to create the virtual world as rendered by virtual world client application 410.

Backend rendering system 418 produces high quality images by using higher quality models, shaders, and textures, or by implementing a ray tracing system. The models, shaders, textures, and ray tracing system utilized by backend rendering system 418 are not used in rendering the virtual world as is typically rendered by virtual world client application 410. In one illustrative embodiment, backend rendering system 418 implements high quality ray tracing effects using a Cell Broadband Engine Architecture based system. In one illustrative embodiment, backend rendering system 418 implements high quality models, shaders, and textures using traditional graphical processing unit hardware.

Responsive to receiving scene description 416, backend rendering system 418 sends request 420 for high fidelity objects to visual database 422. Visual database 422 contains textures, geometry, and shaders that are needed to implement the virtual world. A scene description is downloaded onto backend rendering system 418, and the needed textures, geometry, and shaders are downloaded from the Visual database. Updates are then sent to backend rendering system 418 as the avatar moves in the scene. Backend rendering system 418 adjusts and moves the rendered avatars and objects accordingly.

Visual database 422 stores geometric data, textures, and effects data associated with the form or shape of avatars and objects in the virtual world. Visual database 422 is referenced by an Object avatar-rendering table, such as Object avatar rendering table 310 in order to obtain geometric data, textures, and effects data to render the virtual world. Visual database 422 contains lightweight graphics 424 and high fidelity graphics 426. Lightweight graphics 424 include the 3D geometry, textures, shaders that are utilized by both virtual world server 414 and virtual world client application 410 to render the virtual world to the client. Lightweight graphics 424 are delivered to the virtual world server 414 in response to a request 428 for low fidelity objects sent from virtual world server 414 to visual database 422.

High fidelity graphics 426 is a high fidelity version of geometry, textures, shaders that are utilized by backend rendering system 418 to create high fidelity snapshots and videos. Due to the bandwidth and processing requirements, high fidelity graphics 426 are not utilized by virtual world client application 410 in rendering the virtual world in real time.

Backend rendering system 418 utilizes high fidelity graphics 426 to create high fidelity video and images 430. In one illustrative embodiment, backend rendering system 418 implements high quality ray tracing effects using a cell based system. In one illustrative embodiment, backend rendering system 418 implements high quality models, shaders, textures using traditional graphical processing unit hardware.

In one illustrative embodiment, backend rendering system 418 implements high quality ray tracing effects using the Cell Broadband Engine Architecture based system. Backend rendering system 418 ray tracing determines the visibility of surfaces within an image by tracing imaginary rays of light from viewer's eye to the object. A separate ray is utilized for each resolved point, typically for each pixel of the display. For example, for a modest image resolution of 1064×768, a ray-tracer needs to trace 1064×768, or 817,152 separate rays for each displayed image. While the ray-traced image is very realistic due to the separate casting of each resolved point, the sheer number of rays that must be traced results in a longer process times that are typically unsuitable for real time processing that must occur when implementing a virtual world.

In one illustrative embodiment, backend rendering system 418 implements high quality ray tracing effects using a cell based system. A cell based system is a data processing system using the Cell Broadband Engine Architecture. The Cell Broadband Engine Architecture is a multi-core processor. The cell-based system differs from traditional multi-core processors in that the cell based system does not consist of multiple copies of the same core. Instead, the cell based system utilizes heterogeneous processors, consisting of one PowerPC core and a plurality of synergistic co-processor elements. The synergistic co-processor elements are typically smaller than traditional cores, and are designed for streaming workloads. The PowerPC core performs synchronization tasks and executes non-parallizeable code. The synergistic co-processor elements perform the balance of the work in a streaming manner.

In one illustrative embodiment, backend rendering system 418 creates create high fidelity video and images 430 by sending scene updates to the backend rendering system as the client moves the avatar moves in the scene and objects move or change in the scene. The backend rendering system adjusts and moves the viewing position and rendered avatars and objects accordingly.

In one illustrative embodiment, ray-traced images rendered by the Cell Broadband Engine Architecture based system of backend rendering system 418 are created at fast time intervals using scene updates. To create the illusion of smoother movement between the ray-traced key frames, the key frame animation software extrapolates in-between geometry and positions from scene updates to create a smoother animation.

As the client navigates the virtual world, avatar and camera movement 432 are communicated to virtual world server 414. Additional scene descriptions 434 are passed to backend rendering system 418, and stored in scene update database 436 until additional scene descriptions 434 are utilized by backend rendering system 418. Scene update database 436 is a storage, such as storage 108 of FIG. 1, that holds scene descriptions, such as additional scene descriptions 434, until those scene descriptions are utilized by backend rendering system 418 to create high fidelity video and images 430. Thus, scene update database 436 acts as a buffer system, temporarily storing additional scene descriptions 434 for the backend rendering system 418. In this manner, backend rendering system 418 is able to function in a non-real time. Backend rendering system 418 is therefore able to create realistic images and videos without sacrificing resolution so that processing can be performed in real time.

Once backend rendering system 418 creates high fidelity video and images 430, high fidelity video and images 430 are stored in video database 438 until high fidelity video and images 430 is delivered to a client system.

Figures 5, 6:
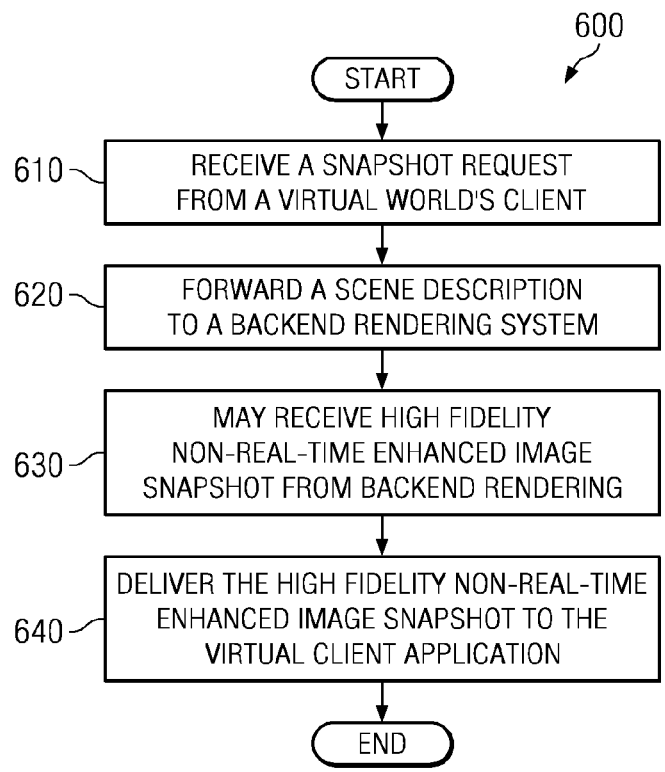
FIG. 5 is a visual database including both high fidelity graphics and low fidelity graphics according to an illustrative embodiment.
FIG. 6 is a flowchart showing the processing steps for receiving a request for, and delivering a high-fidelity non-real-time enhanced image snapshot in a virtual world according to an illustrative embodiment.

Referring now to FIG. 5, a visual database including both high fidelity graphics and low fidelity graphics is shown according to an illustrative embodiment. Visual database 500 is a visual database such as visual database 422 of FIG. 4.

Visual database 500 includes Object identifiers 510. Object identifiers 510 is a universally unique identifier for an object within the virtual world. Each unique object within the virtual world is referenced by a unique one of Object identifiers 510. In a virtual world, assets, avatars, the environment, and anything visual consists of universally unique identifiers (UUIDs) tied to geometric data, textures, and effects data. Geometric data is data associated with the form or shape of avatars and objects in the virtual world. Geometric data may be used to construct a mesh model of an avatar or object. Geometric data is distributed to a user's client computer as binary coordinates. Textures are distributed to a user's client computer as graphics files, such as JPEG files. Texture data refers to the surface detail and surface textures or color that is applied to mesh geometric data to render the object or avatar. Effects data is typically rendered by the user's client according to the user's preferences and the user's client device capabilities.

Visual database 500 includes lightweight graphic 512. Lightweight graphic identifiers 512 include the 3D geometry, textures, shaders that are utilized by both a virtual world server and a virtual world client application, such as virtual world server 414 and virtual world client application 410 respectively, to render the virtual world to the client. Lightweight graphic 512 are delivered to the virtual world server or the virtual world client application in response to a request for low fidelity objects sent from virtual world server to visual database.

Visual database 500 includes high fidelity graphics 514. High fidelity graphics 514 is a high fidelity version of geometry, textures, shaders that are utilized by a backend rendering system, such as backend rendering system 418 of FIG. 4, to create high fidelity snapshots and videos. Due to the bandwidth and processing requirements, high fidelity graphics 514 are not utilized by the virtual world server and the virtual world client application in rendering the virtual world in real time.

Referring now to FIG. 6, a flowchart showing the processing steps for receiving a request for, and delivering a high-fidelity non-real-time enhanced image snapshot in a virtual world is shown according to an illustrative embodiment. Process 600 is a software process executing on a virtual world server, such as virtual world server 414 of FIG. 4.

Process 600 begins by receiving a snapshot request from a virtual world's client application (step 610). The snapshot request is a request for a graphical rendering of the viewable field of a particular user's avatar, as displayed by virtual world client application. The snapshot request can be a request for a static image, or a video of the rendering of the viewable field. The snapshot request can be snapshot request 412 of FIG. 4.

Responsive to receiving the snapshot request, process 600 forwards a scene description to a backend rendering system (step 620). The scene description includes virtual world location information such as an exact camera location within the virtual world, and a camera angle vector. The exact camera location within the virtual world and the camera angle vector can be expressed as coordinates in a 3-D coordinate system, such as for example in an <X, Y, Z> format. The scene description can also include information regarding the format and delivery of the rendered snapshot, such as for example but not limited to, an image size, a file type format, delivery options, whether to include avatars within the snapshot, and desired fidelity/resolution of the snapshot. The scene description going to backend rendering system is a subset of the updates going to the client. That is, only the information that affects the visual or audio representation of the virtual world as rendered in the viewable field of a particular user's avatar are sent in the scene description to the backend rendering system.

At some later time when the backend rendering system has finished processing the high-fidelity non-real-time enhanced image snapshot, process 600 may receive the high-fidelity non-real-time enhanced image snapshot from the backend rendering system (step 630). Responsive to receiving the high-fidelity non-real-time enhanced image snapshot, process 600 delivers the high-fidelity non-real-time enhanced image snapshot to the virtual client application (step 640), with the process terminating thereafter.

Figure 7:
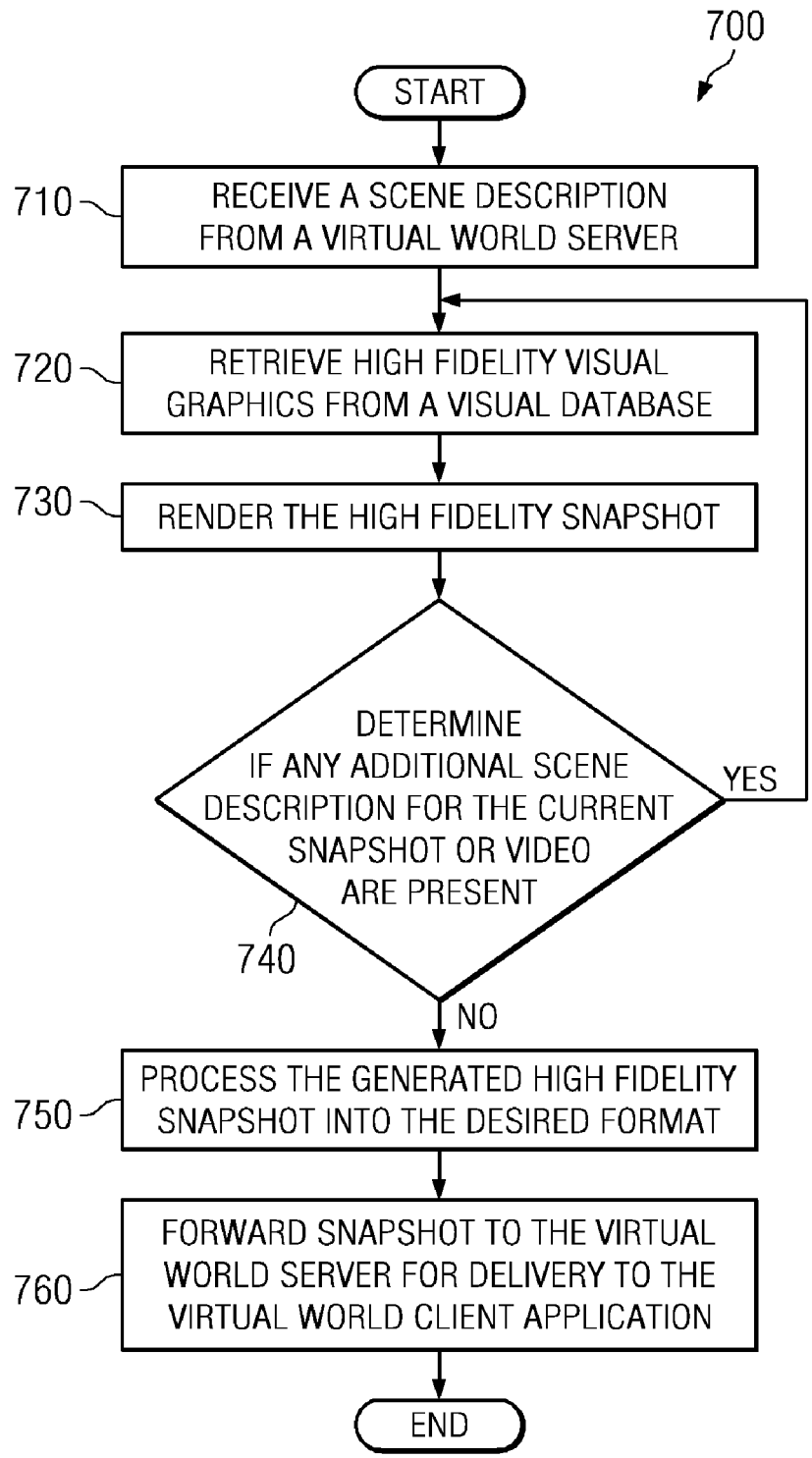
FIG. 7 is a flowchart showing the processing steps for generating a high-fidelity non-real-time enhanced image snapshot in a virtual world according to an illustrative embodiment.

Referring now to FIG. 7, a flowchart showing the processing steps for generating a high-fidelity non-real-time enhanced image snapshot in a virtual world is shown according to an illustrative embodiment. Process 700 is a software process executing on a backend rendering system, such as backend rendering system 418 of FIG. 4.

Process 700 begins by receiving a scene description from a virtual world server (step 710). The virtual world server can be a virtual world server such as virtual world server 414 of FIG. 4. The scene description can be scene description 416 of FIG. 4. The scene description includes virtual world location information such as an exact camera location within the virtual world, and a camera angle vector. The exact camera location within the virtual world and the camera angle vector can be expressed as coordinates in a 3-D coordinate system, such as for example in an <X, Y, Z> format. The scene description can also include information regarding the format and delivery of the rendered snapshot, such as for example but not limited to, an image size, a file type format, delivery options, whether to include avatars within the snapshot, and desired fidelity/resolution of the snapshot. The scene description going to backend rendering system is a subset of the updates going to the client. That is, only that information that affects the visual or audio representation of the virtual world as rendered in the viewable field of a particular user's avatar are sent in the scene description.

Responsive to receiving the scene description, process 700 retrieves high fidelity graphics from a visual database (step 720). The visual database can be a visual database such as visual database 500 of FIG. 5. The high fidelity graphics is a high fidelity version of geometry, textures, shaders that are utilized by the backend rendering system to create high fidelity snapshots and videos. Due to the bandwidth and processing requirements, these high fidelity graphics are not utilized by the virtual world server and the virtual world client application in rendering the virtual world in real time.

Responsive to retrieving the high fidelity graphics from a visual database, process 700 renders the high fidelity snapshot (step 730). The snapshot can be either a static, or a video image. In one illustrative embodiment, backend rendering system implements high quality models, shaders, textures using traditional graphical processing unit hardware. In one illustrative embodiment, process 700 implements high quality ray tracing effects using a cell based system. Process 700 ray tracing determines the visibility of surfaces within an image by tracing imaginary rays of light from viewer's eye to the object.

In one illustrative embodiment, process 700 creates high fidelity video and images at fast time intervals using scene updates. To create the illusion of smoother movement between the ray-traced key frames, the key frame animation software extrapolates in-between geometry and positions from scene updates to create a smoother animation.

Responsive to retrieving the high fidelity graphics from a visual database, process 700 determines if any additional scene description for the current snapshot or video are present (step 740). Process 700 can determine the presence of additional snapshots by identifying additional scene descriptions from a scene update database, such as scene update database 434 of FIG. 4. The additional scene descriptions can be additional scene descriptions 434 of FIG. 4. Responsive to determining that additional scene descriptions are present in the scene update database, process 700 iterates back to step 720. The high fidelity graphics matching the additional scene descriptions are retrieved from the visual database and processed into the high fidelity snapshot.

Responsive to determining that additional scene descriptions are not present in the scene update database, process 700 then processes the generated high fidelity snapshot into the desired format (step 750). In one illustrative embodiment, the high fidelity ray-traced images rendered by a Cell Broadband Engine Architecture based system of backend rendering system are created at fast time intervals using scene updates. These images are then formatted into a smoother movement video using a key frame animation software to extrapolate in-between geometry and positions between the ray-traced key frames from scene updates to create a smooth animation.

Process 700 forwards the snapshot to the virtual world server for deliver to the virtual world client application (step 760), with the process terminating thereafter. By rendering the snapshot in an off-line environment such as in the backend rendering system of Process 700, snapshots are created having a much higher level of detail and realism than those rendered by the virtual world. Snapshot rendered according to the described process possess a level of detail and realism that equal to that achievable with current 3-D hardware and 3-D software rendering applications without adversely influencing the performance of the virtual world server or client. Images within the virtual world continue to be rendered quickly to provide the virtual world client with a smooth navigational and visual experience, while the processing and rendering of the high fidelity video is processed separately by the backend rendering system.

Thus, the illustrative embodiments described herein provide a computer implemented method, a tangible computer storage medium, and a data processing system for generating a non-real-time image snapshot in a virtual world. A backend rendering system receives a scene description from a virtual world server. The backend rendering system then retrieves a high fidelity graphics from a visual database. The visual database contains both the high fidelity graphics and a lightweight graphics. The lightweight graphics are utilized to render the virtual world at a virtual world client application. The backend rendering system then renders the non-real-time image snapshot, and processes the non-real-time image snapshot into the desired format. The non-real-time image snapshot can then be delivered to a client.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for generating a non-real-time image snapshot in a virtual world, the computer implemented method comprising:

receiving at a graphics rendering system, a scene description from a server, wherein the graphics rendering system is separate from the server and separate from a client data processing system;

retrieving with the graphics rendering system a first set of graphics from a visual database, wherein the visual database contains both the first set of graphics and a second set of graphics, wherein the second set of graphics are utilized to render the virtual world at a virtual world client application that is executing on the client data processing system, and wherein the first set of graphics are not utilized by either the virtual world client application or the server in rendering the virtual world in real time, and further wherein the first set of graphics are high fidelity graphics and the second set of graphics are low fidelity graphics;

rendering by the graphics rendering system the non-real-time image snapshot from the first set of graphics and the scene description;

processing with the graphics rendering system the non-real-time image snapshot into the desired format; and delivering by a processor the non-real-time image snapshot to a client application.

2. The computer implemented method of claim 1, wherein the graphics rendering system is a backend rendering system comprising a Cell Broadband Engine Architecture based system for generating images and video of activity within a virtual world.

3. The computer implemented method of claim 1, wherein the step of rendering the non-real-time image snapshot further comprises:

rendering by the graphics rendering system the non-real-time image snapshot by performing a ray tracing to determine the visibility of surfaces for the non-real-time image snapshot.

4. The computer implemented method of claim 1, wherein the step of processing the non-real-time image snapshot into the desired format further comprises:

utilizing key frame animation by the graphics rendering system to create a video image of the non-real-time image snapshot.

5. The computer implemented method of claim 4, further comprising:

receiving at a graphics rendering system a second scene description from the virtual world server;

retrieving with the graphics rendering system a second one of the first set of graphics from the visual database; and rendering by the graphics rendering system a second non-real-time image snapshot; wherein the step of utilizing key frame animation to create a video image of the non-real-time image snapshot further comprises:

utilizing the key frame animation by the graphics rendering system to extrapolate in-between geometries and positions between the non-real-time image snapshot and the second non-real-time image snapshot to create the video image.

6. The computer implemented method of claim 1, wherein the scene description from a virtual world server includes an exact camera location within the virtual world, a camera angle vector, an image size, a desired file type format, a delivery options, whether to include avatars within the snapshot, and desired fidelity and resolution of the snapshot.

7. The computer implemented method of claim 1, wherein the steps of rendering the non-real-time image snapshot and processing the non-real-time image snapshot into the desired format are not performed in real time, and wherein models, shaders, and textures, utilized by the graphics rendering system are not used to render the virtual world at the virtual world client application.

8. A tangible computer storage medium having computer usable program code encoded thereon for generating a non-real-time image snapshot in a virtual world, the tangible computer storage medium comprising:

instructions for receiving at a graphics rendering system, a scene description from a server, wherein the graphics rendering system is separate from the server and separate from a client data processing system;

instructions for retrieving with the graphics rendering system a first set of graphics from a visual database, wherein the visual database contains both the first set of graphics and a second set of graphics, wherein the second set of graphics are utilized to render the virtual world at a virtual world client application that is executing on the client data processing system, and wherein the first set of graphics are not utilized by either the virtual world client application or the server in rendering the virtual world in real time, and further wherein the first set of graphics are high fidelity graphics and the second set of graphics are low fidelity graphics;

instructions for rendering by the graphics rendering system the non-real-time image snapshot from the first set of graphics and the scene description;

instructions for processing with the graphics rendering system the non-real-time image snapshot into the desired format; and instructions for delivering by a processor the non-real-time image snapshot to a client application.

9. The tangible computer storage medium of claim 8, wherein the graphics rendering system is a backend rendering system comprising a Cell Broadband Engine Architecture based system for generating images and video of activity within a virtual world.

10. The tangible computer storage medium of claim 8, wherein the instructions for rendering the non-real-time image snapshot further comprises:

instructions for rendering the non-real-time image snapshot by performing a ray tracing to determine the visibility of surfaces for the non-real-time image snapshot.

11. The tangible computer storage medium of claim 8, wherein the instructions for processing the non-real-time image snapshot into the desired format further comprises:
  instructions for utilizing key frame animation to create a video image of the non-real-time image snapshot.

12. The tangible computer storage medium of claim 11, further comprising:
  instructions for receiving a second scene description from the virtual world server;
  instructions for retrieving a second high fidelity graphics from the visual database; and
  instructions for rendering a second non-real-time image snapshot; wherein the step of utilizing key frame animation to create a video image of the non-real-time image snapshot further comprises:
  instructions for utilizing the key frame animation to extrapolate in-between geometries and positions between the non-real-time image snapshot and the second non-real-time image snapshot to create the video image.

13. The tangible computer storage medium of claim 8, wherein the scene description from a virtual world server includes an exact camera location within the virtual world, a camera angle vector, an image size, a desired file type format, a delivery options, whether to include avatars within the snapshot, and desired fidelity and resolution of the snapshot.

14. The tangible computer storage medium of claim 8, wherein the steps of rendering the non-real-time image snapshot and processing the non-real-time image snapshot into the desired format are not performed in real time, and wherein models, shaders, and textures, utilized by the graphics rendering system are not used to render the virtual world at the virtual world client application.

15. A data processing system comprising:
  a storage device having computer usable program code encoded thereon for generating a non-real-time image snapshot in a virtual world;
  a server:
  a client data processing system;
  a graphics rendering system, wherein the graphics rendering system is separate from the server and separate from the client data processing system;
  a bus system connecting the storage device to a processor; and
  a processor, wherein the processor executes the computer usable program to receive a scene description from the server; retrieve a first set of graphics from a visual database, wherein the visual database contains both the first set of graphics and a second set of graphics, wherein the second set of graphics are utilized to render the virtual world at a virtual world client application that is executing on the client data processing system, and wherein the first set of graphics are not utilized by either the virtual world client application or the server in rendering the virtual world in real time, and further wherein the first set of graphics are high fidelity graphics and the second set of graphics are low fidelity graphics; render the non-real-time image snapshot from the first set of graphics and the scene description; process the non-real-time image snapshot into the desired format; and deliver the non-real-time image snapshot to a client application.

16. The data processing system of claim 15, wherein the graphics-rendering system is a backend rendering system comprising a Cell Broadband Engine Architecture based system for generating images and video of activity within a virtual world.

17. The data processing system of claim 15, wherein the processor executing the computer usable program code to render the non-real-time image snapshot further comprises:
  the processor executing the computer usable program code to render the non-real-time image snapshot by performing a ray tracing to determine the visibility of surfaces for the non-real-time image snapshot.

18. The data processing system of claim 15, wherein the processor executing the computer usable program code to process the non-real-time image snapshot into the desired format further comprises:
  the processor further executing the computer usable program code to utilize key frame animation to create the video image of the non-real-time image snapshot.

19. The data processing system of claim 18, wherein the processor executes the computer usable program code:
  to receive a second scene description from the virtual world server; to retrieve a second high fidelity graphics from the visual database; and to render a second non-real-time image snapshot;
  wherein the processor executing the computer usable program code to utilize the key frame animation to create the video image of the non-real-time image snapshot further comprises the processor executing the computer usable program code to utilize the key frame animation to extrapolate in-between geometries and positions between the non-real-time image snapshot and the second non-real-time image snapshot to create the video image.

20. The data processing system of claim 15, wherein the scene description from the virtual world server includes an exact camera location within the virtual world, a camera angle vector, an image size, a desired file type format, a delivery options, whether to include avatars within the snapshot, and desired fidelity and resolution of the snapshot.

* * * * *